3,334,148
PRODUCTION OF OXYGEN-CONTAINING
ORGANIC COMPOUNDS
Roger Owen Williams, Southsea, and Walter Theodore Dent, Norton-on-Tees, England, assignors to Imperial Chemical Industries Limited, London, England, a corporation of Great Britain
No Drawing. Filed Feb. 10, 1965, Ser. No. 431,724
Claims priority, application Great Britain, Feb. 12, 1964, 5,897/64
12 Claims. (Cl. 260—615)

This invention concerns the production of acetals from acetylene.

According to the invention a process for making acetals comprises reacting acetylene with a primary or secondary alcohol in the presence of a halogen compound of a noble metal of Group 8.

The Group 8 metal compound may be a simple or complex salt. Suitable Group 8 metals are platinum, rhodium, ruthenium and osmium, the preferred metal being platinum. The halogen is preferably chlorine, the chlorides of platinum, rhodium, osmium and ruthenium being very suitable catalysts; platinous chloride and sodium chloroplatinite are particularly preferred. If desired a mixture of compounds may be employed as catalyst. A suitable amount of catalyst is such as to provide 0.001% to 5% of the Group 8 metal by weight of the alcohol.

In order to render the catalyst more soluble in the reaction mixture an acid and/or an alkali metal salt, such as a sodium halide, may be present with the catalyst. The acid may, if desired, be provided by a compound, e.g., an acyl chloride, which yields free acid under the reaction conditions.

The alcohol may be aliphatic, cycloaliphatic or aromatic, and it may be polyhydric, although monohydric alcohols are preferred. Ethanol, n-propanol, normal and secondary butanol and cyclohexanol have been found to be particularly suitable. It is convenient to pass gaseous acetylene into a reaction mixture comprising the alcohol and catalyst; usually an excess of the alcohol is employed in order to restrict the formation of unwanted by-products. The temperature and pressure at which the process is carried out preferably are such as to maintain a liquid phase. Suitable temperatures are in the range 80° C. to 150° C., and suitable pressures in the range 1 to 10 atmospheres gauge. The use of temperatures above 150° C. is undesirable because of, inter alia, unwanted side reactions, such as the formation of the corresponding chloride from the alcohol. Furthermore, when higher temperatures are employed, it is often necessary to start the reaction at a lower temperature and then gradually bring the reactants to the desired temperature.

The following examples illustrate the invention:

*Example 1*

Acetylene was passed at a rate of 3 litres per hour into a stirred mixture of 1.33 gm. platinous chloride and 64 gm. n-butanol maintained at a temperature of 90–95° C. After 5 hours when the weight of the reaction mixture had increased by 8 gm. the reaction mixture was filtered to remove undissolved catalyst and the filtrate analysed by gas/liquid chromatography. The filtrate contained 15.5 gm. n-butanol and 50.8 gm. of the di-n-butyl acetal of acetaldehyde. The yield of the acetal was 67.5% based on the butanol charged and 90% based on butanol converted.

*Example 2*

The procedure of Example 1 was repeated using 2.28 gm. sodium chloroplatinite tetrahydrate instead of platinum chloride. The reaction mixture increased in weight by 6.1 gm. and on filtration yielded a filtrate containing 25 gm. n-butanol and 42 gm. acetal. The yield of the acetal was 56% based on butanol charged and 90% based on butanol converted.

*Example 3*

Acetylene was passed for 5 hours at a rate of 3 litres per hour, into a stirred mixture of 1.37 gm. rhodium trichloride trihydrate, 1.3 gm. sodium chloride and 1.2 gm. acetyl chloride in 64 gm. n-butanol maintained at 90° to 95° C. After filtration the reaction product was shown to contain 35.5 gm. n-butanol and 22 gm. acetal. The yield of the acetal was 29% based on butanol charged and 65% based on butanol converted.

*Example 4*

Acetylene was passed at a rate of 3 litres per hour into a stirred mixture of 1.50 gm. of osmium trichloride and 64.8 gm. n-butanol maintained at a temperature of 95° C. After 5 hours the reaction mixture was filtered. The filtrate contained 54 gm. n-butanol and 12 gm. acetal. The yield of the acetal was 67.5% based on butanol charged and 90% based on butanol converted.

*Example 5*

The procedure of Example 4 was repeated using 1.04 gm. ruthenium trichloride instead of osmium trichloride. Filtration of the reaction mixture yielded a filtrate containing 47 gm. n-butanol and 20 gm. acetal. The yield of acetal was 26% based on butanol charged and 95.5% based on butanol converted.

*Example 6*

The procedure of Example 1 was repeated using 64.8 gm. n-butanol and 0.266 gm. platinous chloride. Filtration of the reaction mixture yielded a filtrate containing 49.8 gm. n-butanol and 15.3 gm. acetal. The yield of acetal was 20% based on butanol charged and 87% based on butanol converted.

*Example 7*

The procedure of Example 1 was repeated using 64.8 gm. of n-butanol and 0.53 gm. platinous chloride. Filtration of the reaction mixture yielded a filtrate containing 39.5 gm. n-butanol and 26.3 gm. acetal. The yield of acetal was 35% based on butanol charged and 90% based on butanol converted.

*Example 8*

The procedure of Example 1 was repeated using 64.8 gm. n-butanol and 1.33 gm. platinous chloride. Approximately 0.7 gm. of catalyst was recovered by filtration and suspended in 4.2 gm. n-butanol. This suspension was then added to a further 64.8 gm. n-butanol and the procedure of Example 1 repeated. Filtration of the reaction mixture yielded a filtrate containing 46 gm. n-butanol and 25 gm. acetal. The yield of acetal was 31% based on butanol charged and 92.5% based on butanol converted.

*Example 9*

Acetylene was passed for 5 hours at a rate of 3 litres per hour into a stirred mixture of 87 gm. ethylene glycol and 1.33 gm. platinous chloride maintained at a temperature of 90° to 95° C. The reaction product was filtered and the filtrate distilled to give 10 gm. of the acetal of ethylene glycol (2-methyl-1,3-dioxolane), boiling point 82° to 83° C. at 755 mm. pressure, and 67.5 gm. unreacted ethylene glycol. The yield of the acetal was 8% based on the glycol charged and 36% based on the glycol converted.

*Example 10*

Acetylene was passed for 5 hours at a rate of 3 litres per hour into a stirred mixture of 1.33 gm. platinous chloride and 63.1 gm. ethanol at a temperature of 80° to 85° C. Filtration yielded a filtrate containing 52.7 gm.

ethanol and 13.2 gm. of the diethyl acetal of acetaldehyde. The yield of acetal was 16.4% based on ethanol charged and 99% based on ethanol converted.

*Example 11*

Acetylene was passed for 5 hours at a rate of 3 litres per hour into a stirred mixture of 1.33 gm. platinous chloride and 64.3 gm. n-propanol at 80° to 85° C. Filtration yielded a filtrate containing 35.6 gm. n-propanol and 34.4 gm. of the dipropyl acetal of acetaldehyde. The yield of acetal was 44% based on n-propanol charged and 98.5% based on n-propanol converted.

*Example 12*

The procedure of Example 11 was repeated using 2.28 gms. sodium chloroplatinite tetrahydrate instead of platinous chloride. Filtration yielded a filtrate containing 31.9 gm. n-propanol and 36.2 gm. acetal. The yield of acetal was 46% based on n-propanol charged and 92% based on n-propanol converted.

*Example 13*

Acetylene was passed for 5 hours at a rate of 3 litres per hour into a stirred mixture of 1.33 gm. platinous chloride and 64.6 gm. sec-butanol at 95° C. Filtration yielded a filtrate containing 50.5 gm. sec-butanol and 12.9 gm. of the di-sec-butyl acetal of acetaldehyde. The yield of acetal was 17% based on sec-butanol charged and 78% based on sec-butanol converted.

*Example 14*

Acetylene was passed for 5 hours at a rate of 3 litres per hour through a stirred mixture of 1.33 gm. platinous chloride and 77 gm. cyclohexanol at 95° C. Filtration yielded a filtrate containing 35 gm. cyclohexanol and 36 gm. of the dicyclohexyl acetal of acetaldehyde. The yield of acetal was 41% based on cyclohexanol charged and 76% based on cyclohexanol converted.

We claim:

1. A process for making acetals from acetylene which comprises reacting acetylene with a primary or secondary alcohol said alcohol selected from the group consisting of cycloalkanols containing up to 6 carbon atoms and alkanols as the sole essential reactants at a temperature up to 150° C. in the presence of a catalyst comprising a halogen compound of a noble metal of Group 8 and recovering the acetal from the reaction mixture.

2. A process for making acetals from acetylene which comprises reacting acetylene with a primary or secondary alcohol said alcohol selected from the group consisting of cycloalkanols containing up to 6 carbon atoms and alkanols as the sole essential reactants at a temperature up to 150° C. in the presence of a catalyst comprising a halogen compound of a noble metal selected from the group platinum, rhodium, osmium and ruthenium, and recovering the acetal from the reaction mixture.

3. A process for making acetals from acetylene which comprises reacting acetylene with a primary or secondary alcohol said alcohol selected from the group consisting of cycloalkanols containing up to 6 carbon atoms and alkanols as the sole essential reactants at a temperature up to 150° C. in the presence of a catalyst selected from the group platinous chloride, sodium chloroplatinite, ruthenium trichloride, osmium trichloride and rhodium trichloride and recovering the acetal from the reaction mixture.

4. A process for making acetals from acetylene which comprises reacting acetylene with an alcohol selected from the group ethanol, n-propanol, n-butanol, sec-butanol and cyclohexanol as the sole essential reactants at a temperature up to 150° C. in the presence of a catalyst comprising a halogen compound of a noble metal selected from the group platinum, rhodium, osmium and ruthenium and recovering the acetal from the reaction mixture.

5. A process for making acetals from acetylene which comprises reacting acetylene with an alcohol selected from the group ethanol, n-propanol, n-butanol, sec-butanol and cyclohexanol as the sole essential reactants at a temperature up to 150° C. in the presence of a catalyst selected from the group platinous chloride, sodium chloroplatinite, ruthenium trichloride, osmium trichloride and rhodium trichloride, and recovering the acetal from the reaction mixture.

6. A process as claimed in claim 1 in which an alkali metal halide is present with the catalyst.

7. A process as claimed in claim 1 in which a sodium halide is present with the catalyst.

8. A process for making acetals from acetylene which comprises passing acetylene into a liquid phase comprising a primary or secondary alcohol said alcohol selected from the group consisting of cycloalkanols containing up to 6 carbon atoms and alkanols and a catalyst comprising a halogen compound of a noble metal selected from the group platinum, ruthenium osmium and rhodium at a temperature up to 150° C. and recovering the acetal from the reaction mixture, the acetylene and alcohol constituting the sole essential reactants.

9. A process as claimed in claim 8 in which an excess of the alcohol is present.

10. A process for making an acetal from acetylene which comprises passing acetylene into a liquid phase comprising an alcohol selected from the group ethanol, n-propanol, n-butanol, sec-butanol and cyclohexanol and a catalyst selected from the group platinous chloride, sodium chloroplatinite, ruthenium trichloride, osmium trichloride, and rhodium trichloride at a temperature of 80° to 95° C., filtering the reaction mixture and recovering acetal from the filtrate, the acetylene and alcohol constituting the sole essential reactants.

11. A process for making the di-n-butyl acetal of acetaldehyde which comprises passing acetylene into a stirred mixture of n-butanol and a catalyst selected from the group platinous chloride, sodium chloroplatinite, ruthenium trichloride, osmium trichloride and rhodium trichloride, at a temperature of 90° to 95° C., filtering the reaction mixture and recovering the acetal from the reaction mixture, the acetylene and n-butanol constituting the sole essential reactants.

12. A process for making an acetal from acetylene which comprises passing acetylene into a liquid phase comprising an alcohol selected from the group ethanol, n-propanol, n-butanol, sec-butanol and cyclohexanol and a catalyst selected from the group platinous chloride and sodium chloroplatinite at a temperature of 80° to 95° C., filtering the reaction mixture and recovering acetal from the filtrate, the acetylene and alcohol constituting the sole essential reactants.

References Cited

FOREIGN PATENTS 1,145,600  3/1963  Germany.

LEON ZITVER, *Primary Examiner.*

H. T. MARS, *Assistant Examiner.*